United States Patent
Gritter

(10) Patent No.: US 7,257,805 B2
(45) Date of Patent: Aug. 14, 2007

(54) RESTORING DEBUGGING BREAKPOINTS SUBSEQUENT TO PROGRAM CODE MODIFICATIONS

(75) Inventor: Daniel S. Gritter, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/040,276

(22) Filed: Nov. 9, 2001

(65) Prior Publication Data

US 2003/0101437 A1    May 29, 2003

(51) Int. Cl.
G06F 9/44    (2006.01)
G06F 11/00    (2006.01)

(52) U.S. Cl. .................... 717/129; 714/34; 714/35

(58) Field of Classification Search ........... 717/129; 714/34, 35
See application file for complete search history.

(56) References Cited

U.S. PATENT DOCUMENTS

| 5,124,989 | A | | 6/1992 | Padawer et al. ............. 371/19 |
|---|---|---|---|---|
| 5,170,464 | A | | 12/1992 | Hayes et al. ................. 395/76 |
| 5,371,747 | A | * | 12/1994 | Brooks et al. ................ 714/38 |
| 5,446,900 | A | * | 8/1995 | Kimelman .................. 717/124 |
| 5,533,192 | A | | 7/1996 | Hawley et al. ........ 395/183.04 |
| 5,815,714 | A | * | 9/1998 | Shridhar et al. ............ 717/129 |
| 5,819,093 | A | * | 10/1998 | Davidson et al. ........... 717/126 |
| 5,835,699 | A | * | 11/1998 | Kimura ....................... 714/34 |
| 6,011,920 | A | | 1/2000 | Edwards et al. ............ 395/704 |
| 6,016,555 | A | | 1/2000 | Deao et al. .................... 712/24 |
| 6,065,106 | A | | 5/2000 | Deao et al. .................. 712/24 |
| 6,081,885 | A | | 6/2000 | Deao et al. ................. 712/227 |
| 6,083,281 | A | | 7/2000 | Diec et al. ..................... 717/4 |
| 6,112,298 | A | | 8/2000 | Deao et al. ................ 712/227 |
| 6,161,216 | A | * | 12/2000 | Shagam ..................... 717/128 |
| 6,256,777 | B1 | * | 7/2001 | Ackerman .................. 717/129 |
| 6,263,489 | B1 | * | 7/2001 | Olsen et al. ................ 717/129 |
| 6,282,698 | B1 | * | 8/2001 | Baker et al. ................ 717/118 |
| 6,286,132 | B1 | * | 9/2001 | Tanaka et al. .............. 717/125 |
| 6,748,584 | B1 | * | 6/2004 | Witchel et al. ............. 717/136 |

FOREIGN PATENT DOCUMENTS

JP    9319615    12/1997

* cited by examiner

*Primary Examiner*—Tuan Dam
*Assistant Examiner*—Michael Yigdall
(74) *Attorney, Agent, or Firm*—Eugene I. Shkurko, Esq.; Blanche E. Schiller, Esq.; Heslin Rothenberg Farley & Mesiti P.C.

(57) ABSTRACT

A debugger provides a user with the ability to trace through the user's program to detect one or more errors. The debugger steps through the program until it reaches a breakpoint set at a selected step by the user. After stepping through the program and detecting one or more errors, the user revises the program and re-executes the debugger. The debugger automatically restores the breakpoint to the selected step, which is often at a different line number in the program, after revisions are made to the program code.

14 Claims, 6 Drawing Sheets

RESTORING DEBUGGING BREAKPOINTS SUBSEQUENT TO PROGRAM CODE MODIFICATIONS

TECHNICAL FIELD

This invention relates, in general, to the debugging of computer programs, and, in particular, to the restoring of debugging breakpoints, subsequent to modifying code of a program.

BACKGROUND OF THE INVENTION

Computer programs (or applications) are created using programming languages. These programming languages include human-readable text which are translated by a compiler to generate machine-readable instructions. In particular, the compiler translates each line of the programming language into a sequence of machine-readable instructions, which perform the logical task described by the line of programming language code.

During the course of programming, errors may occur due to programmer error. These errors include either syntax errors or logic errors. Syntax errors are caught by the compiler, which refuses to generate machine instructions for a line of programming language that it does not understand. Logic errors are caught by detecting that the program does not perform as expected, often resulting in program exceptions or incorrect behavior. While syntax errors can be corrected by determining the correct syntax, logic errors are often much more difficult to ascertain. For this reason, a special class of computer programs was developed. These programs are called debuggers. A debugger allows the user to trace through the user's own program, while it is executing on the computer, often in the original human-readable text format originally used in the programming language. This allows the programmer to determine the instance or instances where the logical flow of the program is incorrectly designed.

Several features are common to many debuggers, including, for instance, the ability to step through the code line by line, the ability to display the current value of variables, as well as the ability to execute until the program hits a set breakpoint at a selected point in the program. This breakpoint is often associated with a specific line number in the human-readable text, and is referred to herein as a line breakpoint.

Typically, the debugging process is iterative, often requiring the re-execution of a program after minor modifications to the code. Thus, it is convenient for the debugger to restore the line breakpoint in each consecutive execution of the program.

Several debuggers perform this task. However, these debuggers restore the breakpoint to the exact same line as the original line breakpoint was set. The disadvantage of this approach is that during the debugging process, the programmer will often change the code slightly to determine where the flaw is within the program. Because this will change the line number of the intended location of the saved breakpoint, the programmer is required to manually reset the breakpoint upon each iteration of debugging. This task is time consuming and error prone.

Thus, a need exists for an improved debugger. In particular, a need exists for a debugger that does not require a manual resetting of the breakpoint on each re-execution of the program.

SUMMARY OF THE INVENTION

The shortcomings of the prior art are overcome and additional advantages are provided through the provision of a method of restoring debugging breakpoints. The method includes, for instance, having a breakpoint that is set to a selected step of a program; and automatically restoring, after modification of the program, the breakpoint to the selected step, wherein the selected step is at a different location within the modified program.

In a further aspect of the present invention, a method of facilitating debugging of programs is provided. The method includes, for instance, using a debugger to step through a program until it reaches a breakpoint at a selected step; and re-running the debugger, subsequent to revising the program, to step through the revised program until it reaches the breakpoint at the selected step, the breakpoint automatically restored, subsequent to the revising, to the selected step, regardless of the location of the selected step within the revised program.

System and computer program products corresponding to the above-summarized methods are also described and claimed herein.

Advantageously, a capability is provided that enables the automatic resetting of a line breakpoint to a selected step within a program, after changes have been made to the program.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In one aspect of the present invention, a capability is provided for facilitating the resetting of a line break point, subsequent to making code changes within a program. In particular, as one example, a debugger is provided with an ability to automatically restore the breakpoint to the same logical step within the program, rather than to a saved line number within the text of the program. This allows the programmer to quickly test a code fix without having to manually reset a line breakpoint to the correct line.

Figure 1A:
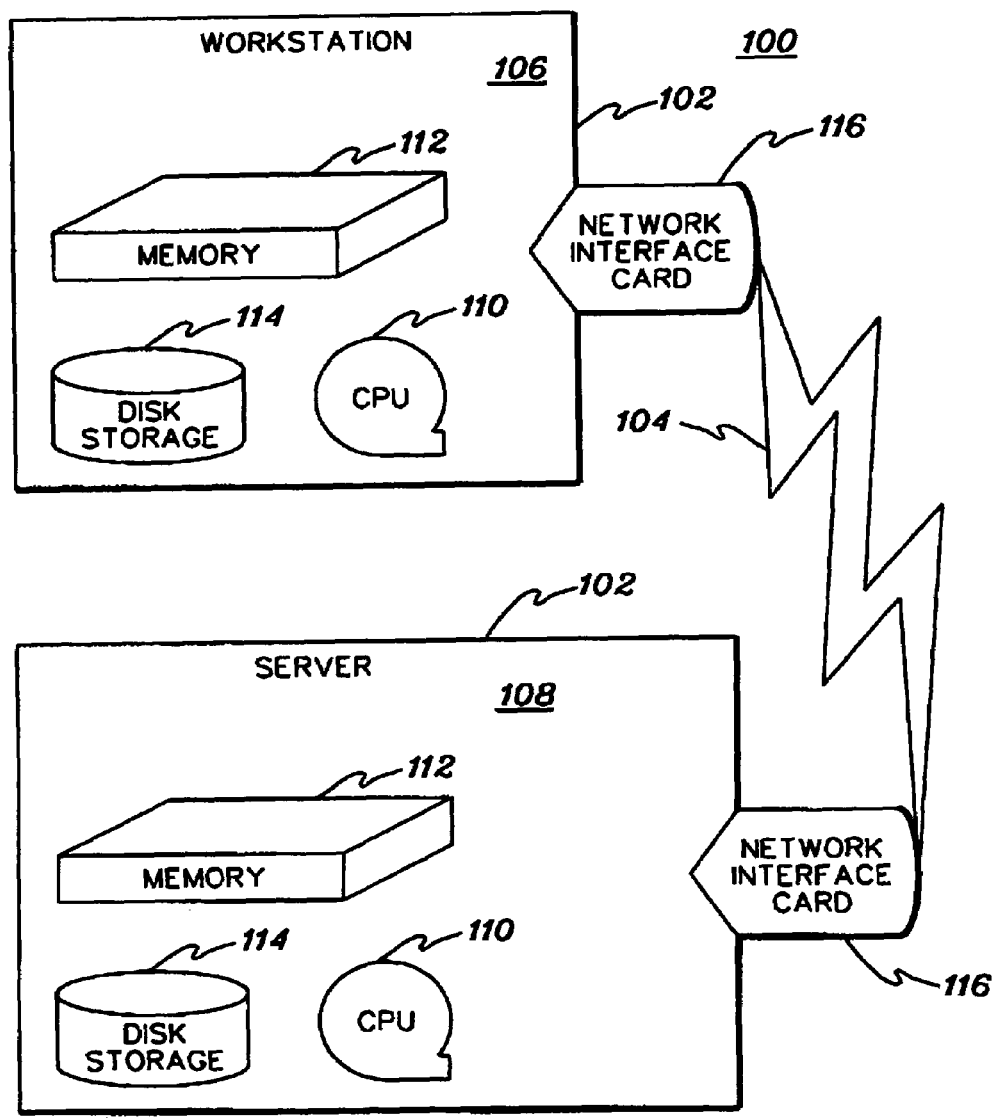
FIG. 1a depicts one embodiment of a computing environment incorporating and using one or more aspects of the present invention.

One embodiment of a computing environment incorporating and using one or more aspects of the present invention is depicted in FIG. 1a. A computing environment 100 includes, for instance, a plurality of computing units 102 coupled to one another via a connection 104. In one example, one of the computing units is a workstation 106 executing an operating system, such as Windows NT or LINUX, as examples, and the other computing unit is a server 108 executing the z/OS or OS/390 operating system, offered by International Business Machines Corporation, Armonk, N.Y. Each computing unit includes, for example, a central processing unit (CPU) 110, a memory 112 and one or more input/output devices 114, which are well known in the art.

Connection 104 is, for instance, a TCP/IP connection, which includes a network interface card 116 at each end. In other embodiments, however, connection 104 may be any type of connection, such as a wire connection, token ring or network connection, to name just a few examples.

The computing environment described above is only one example. One or more aspects of the present invention can be incorporated and used with other types of computing units, computers, processors, nodes, systems, workstations and/or environments, without departing from the spirit of the present invention.

For example, aspects of the present invention can be used in a single system environment. One such environment may include, for instance, an RS/6000 computer system running the AIX operating system, offered by International Business Machines Corporation, Armonk, N.Y. In yet a further embodiment, one or more aspects of the invention can be included in a large parallel system with a plurality of units coupled to one another. These and many other types of environments are capable of incorporating and using aspects of the present invention.

Figure 1B:
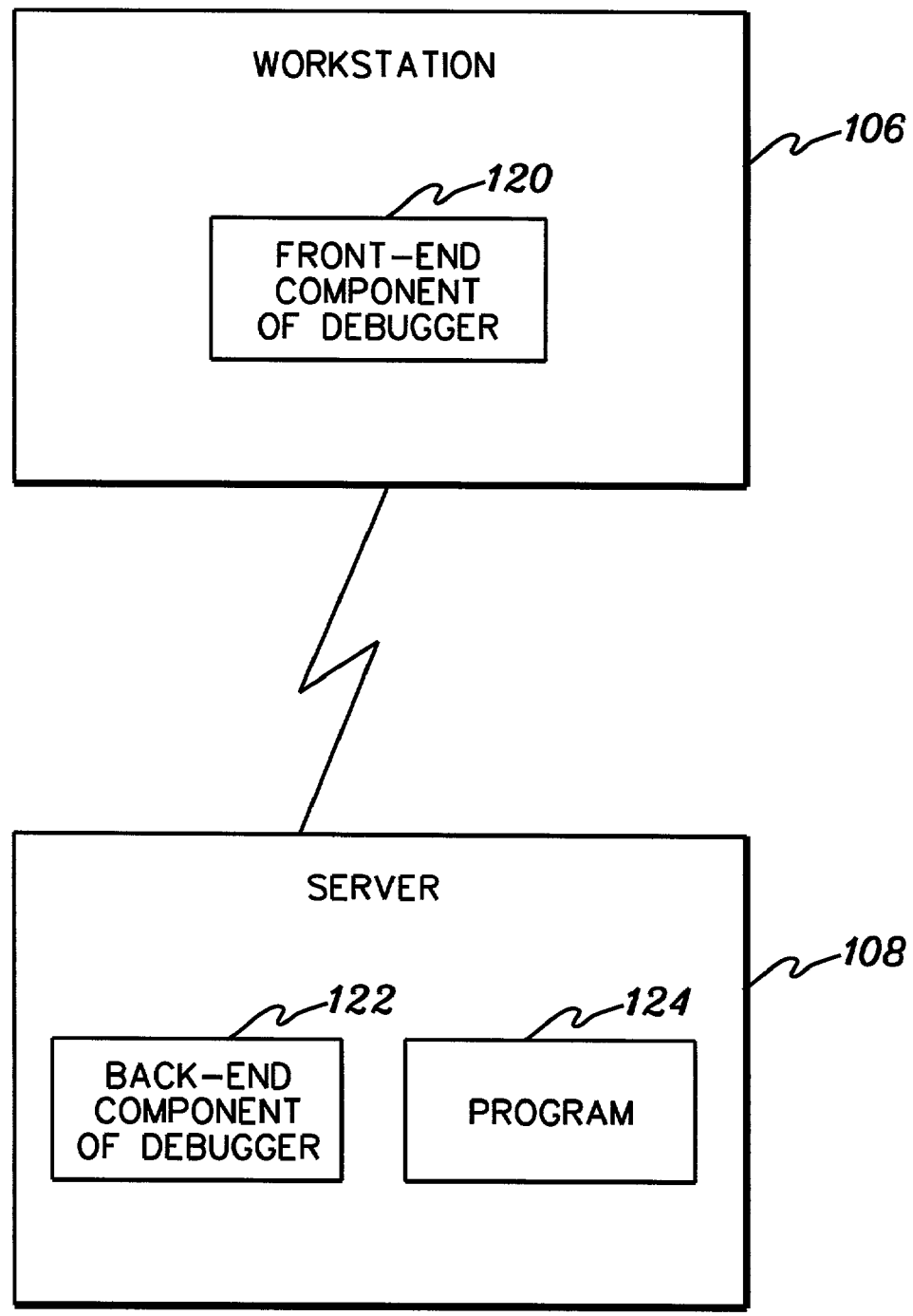
FIG. 1b depicts one embodiment of a distributed debugger executing within the environment of FIG. 1a, in accordance with an aspect of the present invention.

In accordance with an aspect of the present invention, executing within the computing environment is a debugger. As one example, this debugger is a distributed debugger, in which components of the debugger are running on the various computing units. For example, as shown in FIG. 1b, a front-end component of a debugger 120 is executing on workstation 106 and a back-end component of the debugger 122 is executing on server 108. The front-end component includes a user interface to facilitate user input to the debugger; and the back-end component includes the logic used in performing the debugging of a user's program 124 running on server 108. One example of such a distributed debugger is the IBM Distributed Debugger.

Although a distributed debugger is described herein, the capabilities of the present invention are not limited to such a debugger. Non-distributed debuggers may also be used. For example, one or more aspects of the present invention can be incorporated and used in a single system environment using a non-distributed debugger.

A debugger is used during the process of software development in order to detect one or more errors. The debugger sets a breakpoint at a selected step of the program, and the program executes until it reaches the breakpoint. The user examines output of the debugger and may encounter one or more errors. If an error is found, then the code may change. In order to accommodate this change, the debugger automatically resets, in accordance with an aspect of the present invention, the breakpoint to the selected step. In one example, this ability is provided by saving information about the breakpoint, in addition to the breakpoint line number.

Figure 2:
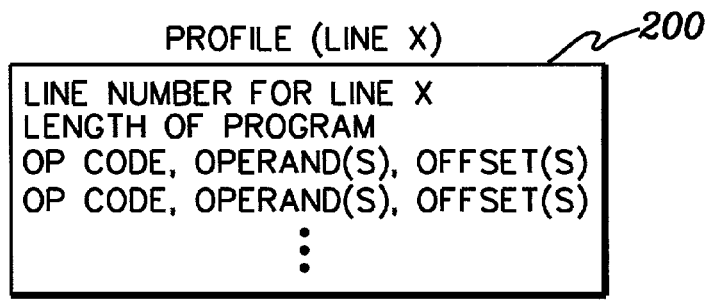
FIG. 2 depicts one embodiment of information stored in a profile, which is used in accordance with an aspect of the present invention.

The information is saved in, for instance, an instruction profile, which includes various information relating to the specific instructions generated by the compiler for a given line of code. One example of such a profile is depicted in FIG. 2.

A profile 200 is generated for a given line of code, Line X, and includes one or more attributes of the machine instructions generated for that line of code. For instance, the S/390 architecture uses op codes, operands and offsets as attributes of the machine instructions. Thus, one or more of these is stored in the profile, as appropriate to the instruction being debugged. Additionally, the line number of the instruction and the length of the program are also stored. In other embodiments, additional and/or other attributes may be stored and used.

Since code is not optimized when debugging, the instructions generated by the compiler for a line of code at one location in the program are similar to the instructions generated for the same line of code elsewhere in the program. Therefore, to restore the breakpoint, the generated code can be compared to the saved profile to determine the step corresponding to the line breakpoint, rather than simply restoring the saved breakpoint to the same line number.

In one embodiment, various tasks are performed in order to automatically restore a breakpoint to a selected step, subsequent to modifying the program which includes that step. These tasks include, calibration, profile creation and breakpoint restoration, each of which is described below.

Calibration

Calibration is used to determine the number of instructions needed to reference a unique line of code within a given program. That is, calibration is used to determine how many instructions are to be included in the profile. In some instances, this value may be provided by the debugging information stored by the compiler, and thus, may not need to be calculated. However, in other instances, the compiler may not generate sufficient information in the debug tables to determine this value, in which case the value is calculated, as described herein.

During calibration, the debugger saves and restores a breakpoint for a known line number. If the restoration of the breakpoint returns an ambiguous or incorrect result, then the number of instructions in the instruction profile is increased. This is repeated until the breakpoint is restored correctly. The size of the instruction profile is then saved and used for future line breakpoints.

One embodiment of the logic associated with determining the number of instructions to be included in the instruction profile is described with reference to FIG. 3. In one example, this logic is performed by the debugger, in response to reaching a first breakpoint chosen by the user. In this embodiment, calibration is not re-run for each iteration of the program. It is run once to determine the calibration value, which is saved and then used each time the program is modified and re-run. In another embodiment, however, calibration is performed a selected number of times during the process (e.g., each iteration, every n iterations, etc.).

Figure 3:
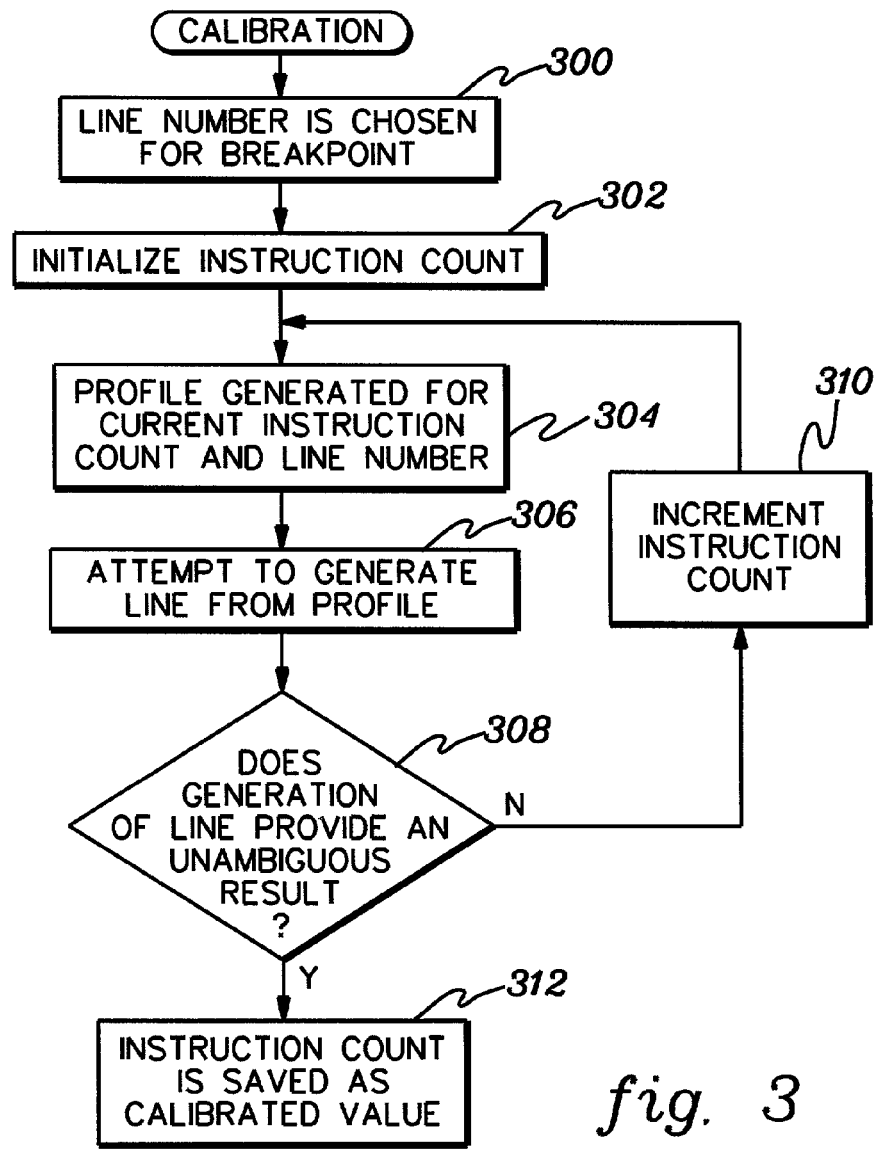
FIG. 3 depicts one embodiment of the logic associated with a calibration task used in accordance with an aspect of the present invention.

Referring to FIG. 3, initially, a line number is chosen for a breakpoint, STEP 300. In one example, this line number is chosen by the user and input to the debugger via the debugger interface. Additionally, an instruction count is initialized to one, STEP 302.

Subsequent to selecting the line number to be used as the breakpoint and initializing the instruction count, a profile is generated for the current instruction count and the selected line number, STEP 304. One embodiment of the logic associated with generating the profile is described hereinafter with reference to FIG. 4.

Thereafter, the profile is used in an attempt to generate a line (i.e., select a line from the code) that corresponds to the chosen breakpoint, STEP 306. One embodiment of the logic associated with generating the line is described hereinafter with reference to FIG. 5.

Thereafter, a determination is made as to whether the generation of the line provides an unambiguous result, INQUIRY 308. If the generation of the line provides an ambiguous result, then the instruction count is incremented, STEP 310, and processing continues with STEP 304. However, if the generation of the line produces a line that matches (at least in part) the line at the chosen breakpoint, then the instruction count is saved as the calibrated value, STEP 312. This calibrated value is used during subsequent profile creations, in response to a user requesting a breakpoint to be set.

Profile Creation

Profile creation is run by, for instance, the debugger, when the user requests a line breakpoint be set. In particular, in this embodiment, it is executed during calibration in order to determine the calibrated value, and it is also executed when other requests are made to set a breakpoint. For the other requests, the calibrated value is used in creating the profile.

The instruction profile is generated from the machine instructions at the requested execution point, and includes the number of instructions designated by the calibrated value (assuming it is not being executed for calibration). The instruction profile is saved to non-volatile storage for retrieval upon re-execution of the program.

Figure 4:
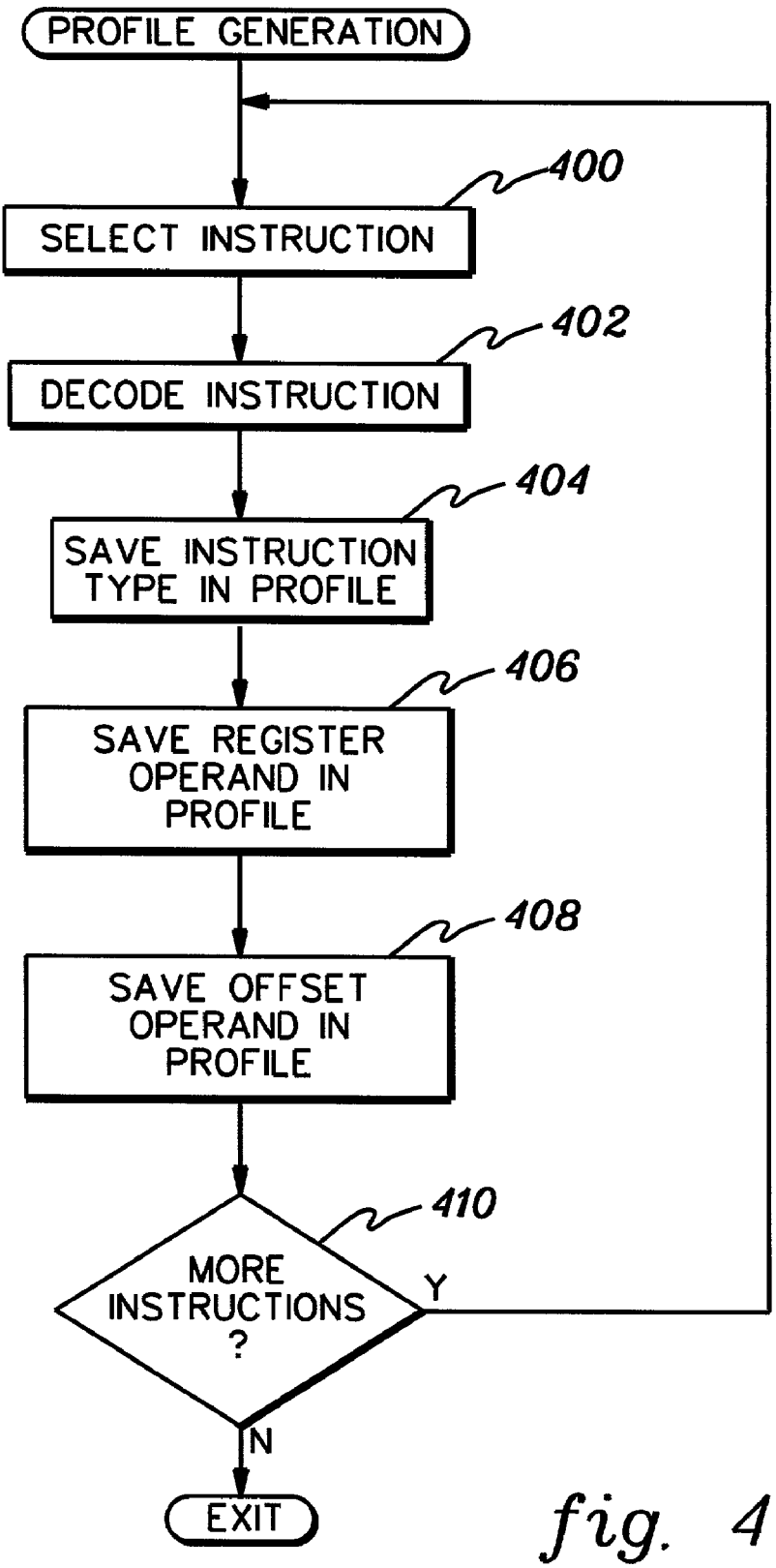
FIG. 4 depicts one embodiment of the logic associated with generating a profile used in accordance with an aspect of the present invention.

One embodiment of the logic associated with creating a profile is described with reference to FIG. 4. Initially, a machine instruction generated for the line of code chosen as the breakpoint is selected, STEP 400, and that instruction is decoded, STEP 402. For example, various attributes of the program's object code are retrieved. These attributes are then saved in the profile. For instance, the instruction type (e.g., the op code), zero or more register operands, and zero or more offset operands are saved in the profile, STEPS 404, 406, 408.

Thereafter, a determination is made as to whether there are more instructions to be processed, INQUIRY 410. This determination is made, in one example, by comparing the number of instructions decoded with the calibrated value. (During calibration, the determination is based on the instruction count.) If the number of instructions processed is less than the calibrated value, then there are more instructions to be processed, and processing continues with STEP 400. Otherwise, the creation of the profile is complete, and the profile is ready to be used during breakpoint restoration.

Breakpoint Restoration

Breakpoint restoration is run by, for instance, the debugger during calibration, and at other times when a breakpoint is to be restored. A breakpoint is to be restored when, for instance, the debugger is restarted for the same program (which may have been modified). During breakpoint restoration, the instruction profile is read from non-volatile storage and used to restore the breakpoint. In particular, breakpoint restoration is used to locate the correct step within the program at which the breakpoint is now to be set.

Figure 5A:
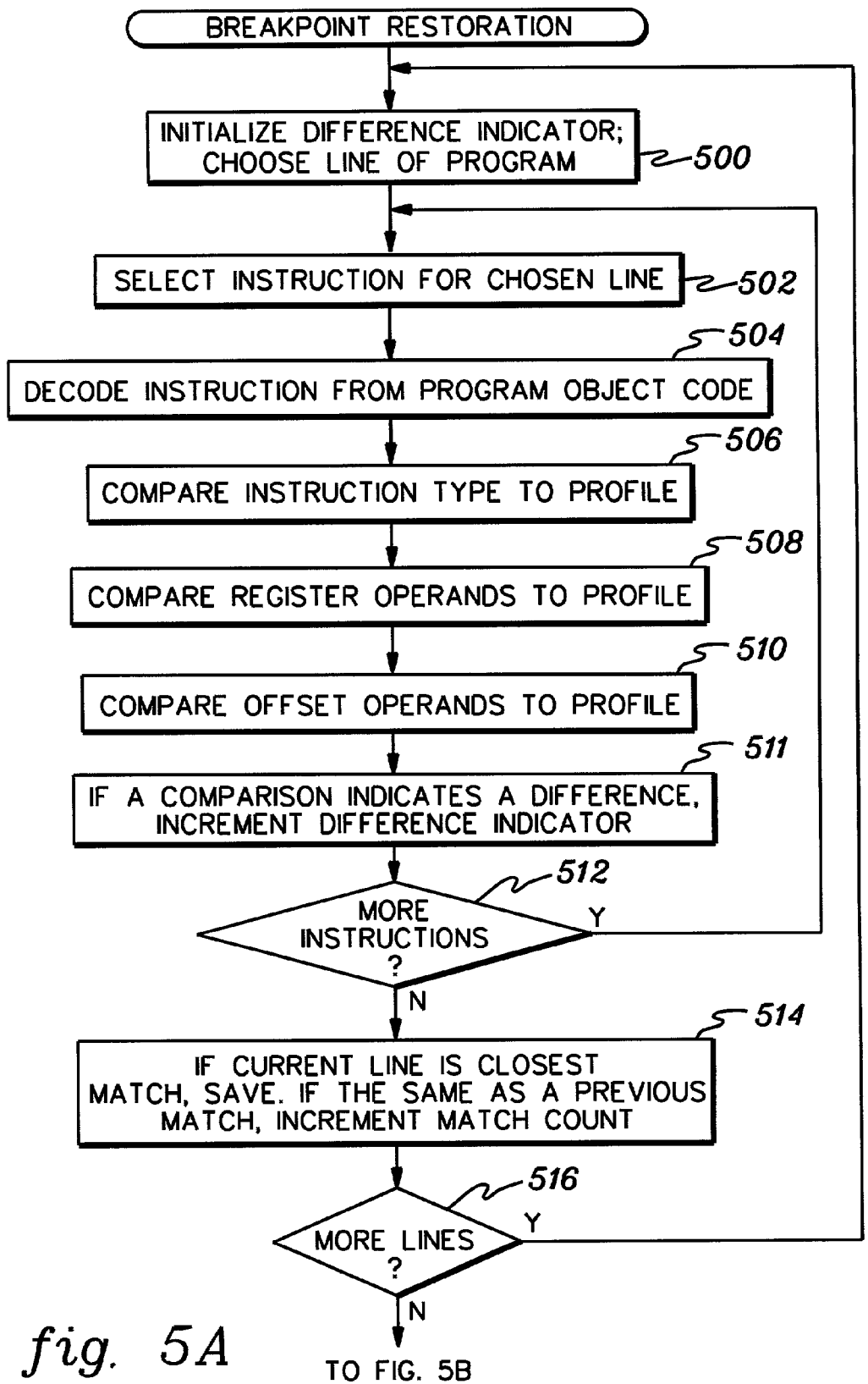
FIGS. 5a-5b depict one embodiment of the logic associated with restoring a breakpoint, in accordance with an aspect of the present invention.
Figure 5B:
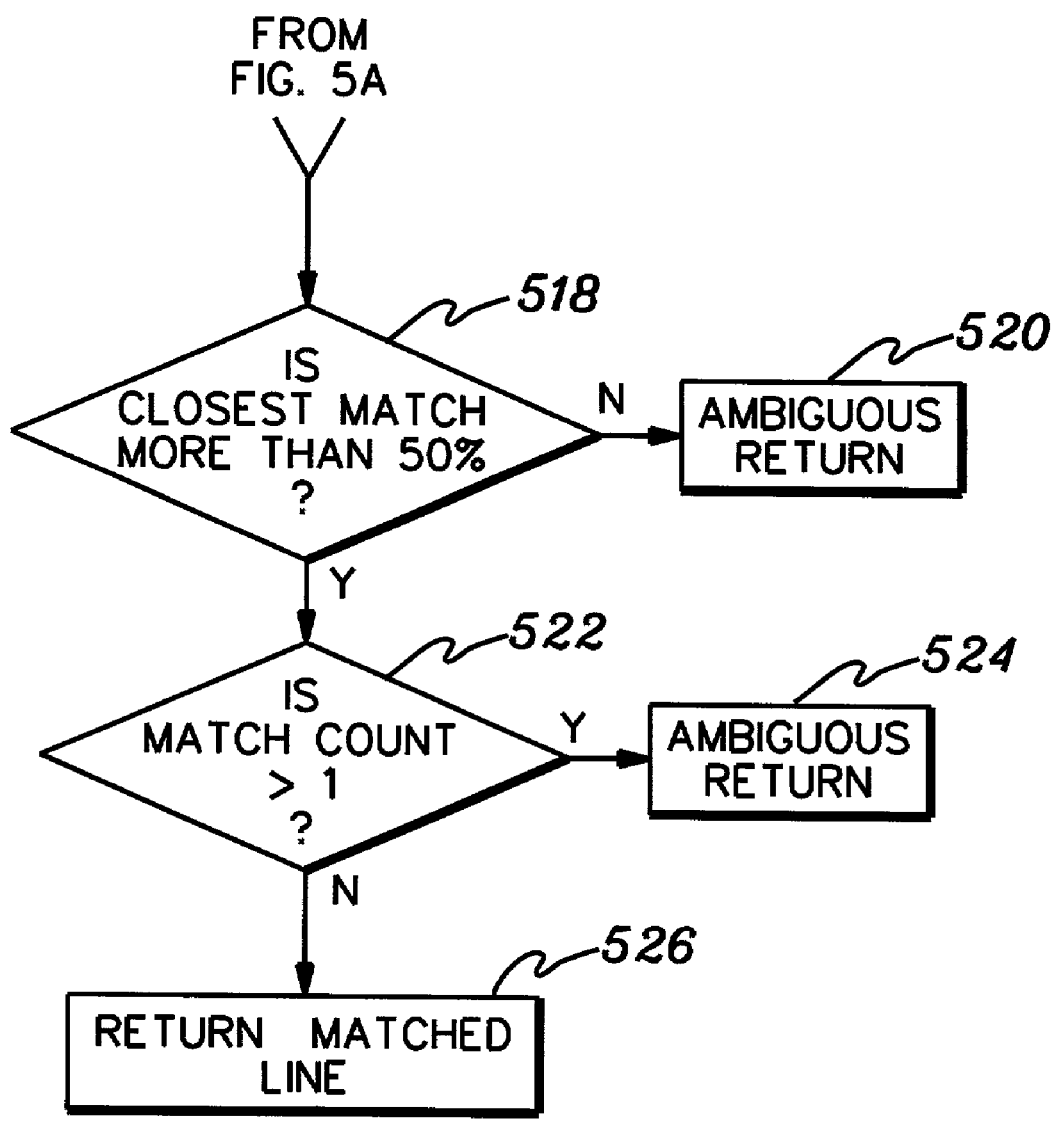

One embodiment of the logic associated with breakpoint restoration is described with reference to FIGS. 5a-5b. Initially, a variable referred to as a difference indicator, described below, is initialized to zero, and a line of the program is chosen to begin the breakpoint restoration, STEP 500 (FIG. 5a). The line that is chosen is dependent on whether the breakpoint restoration is being executed for calibration or for restoration of a selected breakpoint subsequent to calibration. In the case in which breakpoint restoration is being performed for calibration, the first line of the program is chosen. However, in the case in which breakpoint restoration is being performed for a selected breakpoint other than calibration, a line within a selected range of the program is selected.

As one example, the starting point of the selected range is determined by taking the difference in the total number of lines of the modified program and the original program and adding that difference to the original line number. This location is used since it is quite likely that the code may be in a similar position in relation to the surrounding code. Therefore, if the program is longer, it is likely that the line number is shifted up by the number of lines increased in the total number of lines of the program. Likewise, a shorter program causes the line number to be shifted down the number of lines decreased.

The instruction profile is also compared to the instructions at the original line number (even if not included in the range), since it is also possible that the inserted lines were placed after or before the original lines, in which case, there would be no shift in the saved line number. In another embodiment, the original line number is selected first, and then one or more lines of the selected range. It is also possible to have other selected ranges or not to check the original line number.

Although in this embodiment, the breakpoint restoration is executed, during calibration, for each line of a program, in other embodiments, less than the entire program may be used. Similarly, for a restoration of breakpoints other than calibration, the range of code lines may include the entire program or any other desired range. The examples provided herein are only examples and the invention is not limited to such examples.

Subsequent to choosing a line of the program, a machine instruction generated by the compiler for that chosen line is selected, STEP 502. The instruction is then decoded, STEP 504, and various attributes of the instruction are compared to one or more attributes saved in the instruction profile. For example, the instruction type (e.g., the op code) is compared to the op code stored in the profile for the particular instruction being decoded, STEP 506. Additionally, one or more of the register operands are compared to the register operands stored in the profile for this instruction, assuming such operands exist, STEP 508. Similarly, the one or more offset operands are compared to the one or more offset operands stored in the profile for this instruction, assuming such operands exists, STEP 510.

Should a comparison indicate a difference, then the difference indicator is incremented, STEP 511. In one example, the amount of the increment is dependent on how significant the difference. For instance, if the difference is in the op code, then the increment is typically larger than if the difference is in a line number. As one example, the difference indicator is incremented by the difference of the two values being compared. However, in other embodiments, the increment may be the same for each difference or other possibilities exist.

Subsequently, a determination is made as to whether there are more instructions to be processed for this code line, INQUIRY 512. In one example, this determination is made by comparing the number of instructions processed to the number of instructions in the profile. If there are more instructions to be processed, then processing continues with STEP 502. However, if there are no more instructions to be processed for this chosen line of program, then processing continues with STEP 514.

At STEP 514, the current line number (at least) is saved, if the comparisons indicate that the current instruction is closest in match to the profile. This is determined by comparing the current difference indicator to a saved difference indicator. Further, if the current line is the same as a previous match (e.g., the current difference indicator is equal to the saved difference indicator), then a variable referred to as match count, which is initialized to one, is incremented by one. If the current line is a better match than the previous match, then the match count variable is reset to one. Additionally, if the current instruction is the closest, then the current difference indicator is saved as the saved difference indicator.

Subsequently, an inquiry is made as to whether there are more lines to be processed, INQUIRY 516. In one example, this inquiry is made by determining whether each of the lines of the selected range of lines has been processed. If not, then processing continues with STEP 500. However, if the chosen lines have been processed, then processing continues with INQUIRY 518 (FIG. 5b).

At INQUIRY 518, a determination is made as to whether more than 50% of the attributes of the profile match the attributes of the instruction that is indicated as the closest match. If the closest match is less than 50%, then an ambiguous return is provided, STEP 520. However, if the closest match is more than 50%, then a further determination is made as to whether the match count is greater than one, INQUIRY 522. If the match count is greater than one indicating that there are more than one lines that match the profile, then an ambiguous return is provided, STEP 524. However, if the closest match is more than 50% and the match count is less than or equal to one, then the matched line number is returned, STEP 526. This completes the breakpoint restoration.

Subsequent to successfully completing the breakpoint restoration (assuming not in calibration), the debugger sets the breakpoint at the line indicated by the restoration. This line corresponds to the same step within the program at which the breakpoint was originally set.

Described in detail above is one embodiment for automatically resetting a breakpoint in a program to the same step, subsequent to modifying the code of the program. Examples demonstrating usage of the capability are provided below. These examples are only for illustrative purposes and are not meant to be limiting in any way.

One example of an overview of a debugging session, which includes one or more aspects of the present invention is described below.

The user communicates to the debugger using a front-end user interface that allows the user to perform the tasks allowed by the debugger, such as setting breakpoints, displaying variables, and so on. When a user sets a breakpoint (e.g., a line breakpoint), the calibration task occurs. This is described further with reference to the following mapping.

An example of the mapping between source lines and a readable description of machine code is provided below. In this case, line 2 of the source view equals line 1 of the machine view, 3=2, 4=3-4, 5=5, 7=6-7, 8=8 and 10=9.

| Source View On Debugger Front End | Machine Instructions In Application |
|---|---|
| Line 1: /*Test program 1*/ | 00001 L 1,4,0 |
| Line 2: int i = 0; | 00002 L 1,5,1 |
| Line 3: int j = 1; | 00003 TC 1,4,5 |
| Line 4: if (i > j) { | 00004 BL 6 |
| Line 5: print hello; | 00005 P hello |
| Line 6: } | 00006 TC 1,4,5 |
| Line 7: if (j > i) { | 00007 BH 9 |
| Line 8: print world; | 00008 P world |
| Line 9: } | 00009 G back |
| Line 10: exit; | |

When a user sets a line breakpoint for line 7 in the source view, the calibration step occurs. Line six of the machine instruction (which corresponds to line 7 of the source view) is selected as the current execution point in the application (i.e., the breakpoint). Calibration is performed, and initially, an ambiguous result returns, as both machine lines three and six match the instruction profile of one line (TC 1,4,5). This causes the instruction profile to be increased, which results in an unambiguous return of machine instruction six, which matches the set line 7. This causes (TC 1,4,5; BH 9) to be saved as the instruction profile for the line breakpoint.

At this point, the user modifies the source code. The following provides an example of the modified mapping between source lines and a readable description of machine code. In this case, 2=1, 3=2, 4=3, 5=4, 6=5-6, 7=7, 9=8-9, 10=a, 12=b.

| Source View On Debugger Front End | Machine Instructions In Application |
|---|---|
| Line 1: /*Test program 1*/ | 00001 L 1,4,0 |
| Line 2: int i = 0; | 00002 L 1,5,1 |
| Line 3: int j = 1; | 00003 P 4 |
| Line 4: print i; | 00004 P 5 |
| Line 5: print j; | 00005 TC 1,4,5 |
| Line 6: if (i > j) { | 00006 BL 8 |
| Line 7: print hello; | 00007 P hello |
| Line 8: } | 00008 TC 1,4,5 |
| Line 9: if (j > i) { | 00009 BH b |
| Line 10: print world; | 0000a P world |
| Line 11: } | 0000b G back |
| Line 12: exit; | |

When the debugger is restarted, the breakpoint is restored. The saved total number of lines of the original program, 10, is subtracted from the new number of lines, 12, and added to the saved line number, 7. The instruction profile is then compared to machine instructions for line 9, the result of the above calculation. So, machine lines 8 and 9 are compared to (TC 1,4,5; BH 9). This results in a very close match, a difference of 2(b−9=2). A difference counts as the change in any value in the instruction profile. Since numbers are subtracted, different opcodes result in a very high score (a lower score indicates a better match). Because an exact match is not found, the instruction profile is compared with each set of instructions from line 7 to line 9. In this case, the original match at line 9 is the best, so the breakpoint is restored at line 9.

A further example of automatically restoring a breakpoint, subsequent to program code modification is described below: Given a small program A:

```
1 ENTRY DS 0H        // LABEL
1 L R1,230 (R8)      // load register 1 from the address in
                     // register 8 + 230
2 LOOP DS 0H         // LABEL
2 L R2, 0 (R1)       // load register 2 from the address in
                     // register 1
3 LTR R2,R2          // set condition code
4 BZ ZERO            // register two == zero ? goto zero
                     // label : goto next instruction
5 AH R2,=H'32'       // add 0x32 to register 2
6 ST R2, 0 (R1)      // store register 2 to the address in
                     // register 1
7 NONZERO DS 0H      // LABEL
7 LA R1,4 (R1)       // increment the address in register 1
                     // by 4 bytes
8 B LOOP             // continue with the loop
9 ZERO DS 0H         // LABEL
9 EXIT DS 0H         // LABEL
9 BALR R1,R14        // return to caller
```

While debugging this small program, the user sets breakpoint at line 8: B LOOP; does minor debugging; notices register one is not getting set up properly; and modifies the code.

The profile saved from line 8 includes the following: [op code]–0x47 (BC) [operand 1]–15 [operand 2]—offset to LOOP label=2(R3) (Register 3 is base register).

After code changes, A becomes A':

```
1 ENTRY DS 0H        // LABEL
+1 L R13,512 (R0)    // load register 13 from low core
+2 L R8,124 (R13)    // load register 8 from stack save area
3 L R1,230 (R8)      // load register 1 from the address in
                     // register 8 + 230
4 LOOP DS 0H         // LABEL
4 L R2,0 (R1)        // load register 2 from the address in
                     // register 1
5 LTR R2,R2          // set condition code
6 BZ ZERO            // register two == zero ? goto zero label :
                     // goto next instruction
7 AH R2,=H'32'       // add 0x32 to register 2
8 ST R2,0 (R1)       // store register 2 to the address in
                     // register 1
9 NONZERO DS 0H      // LABEL
9 LA R1,4 (R1)       // increment the address in register 1 by 4
                     // bytes
10 B LOOP            // continue with the loop
11 ZERO DS 0H        // LABEL
11 EXIT DS 0H        // LABEL
11 BALR R1,R14       // return to caller
```

In one example, when the debugger is restarted, profile is compared to the original line, line 8: instruction: op-code 0x50 operand 1-2 operand 2-0(R1) profile: op-code 0x47 operand 1-15 operand 2-6(R3)

None of the items match, so this is not the original breakpoint location. At this time, a delta value equal to the change in the number of lines, in this case 2, is used as a starting point.

The code compares each of the lines 6-10, assigns each a score, and restores the breakpoint at the closest match.

The two closest matches are lines 6 and 10: line 6 instruction: op-code 0x47 operand 1-8 operand 2-10(R3) line 10 instruction: op-code 0x47 operand 1-15 operand 2-4(R3) profile : op-code 0x47 operand 1-15 operand 2-6 (R3)

Line 10 is the closest match, since it meets two out of the three attributes exactly and is the closest match for the third attribute. Thus, the breakpoint is set at line 10, the correct location.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of restoring debugging breakpoints in a source code program, said method comprising:
   setting a breakpoint to a selected step of a first version of the source code;
   creating an instruction profile for the selected step, said instruction profile comprising one or more specific attributes of one or more machine instructions generated for the selected step and one or more specific attributes of zero or more other machine instructions generated for the first version of source code, and wherein the instruction profile further comprises a source line number for the selected step and a length of the first version of source code, and
   automatically restoring the breakpoint to the selected step of a modified program, in response to modification of the first version of source code to provide the modified program having a second version of source code, wherein the selected step is at a different location within the modified program and wherein the automatically restoring comprises comparing one or more operation codes of one or more machine instructions generated for the second version of source code with one or more operation codes of the instruction profile created based on the first version of source code to determine which machine instruction of the modified program corresponds most closely to the selected step and wherein the automatically restoring comprises using the source line number and length to determine a starting point within the modified program to select the one or more machine instructions generated for the second version of the source code to be used in the comparing.

2. The method of claim 1, wherein the comparing yields one or more difference counts and a difference count having a smallest value indicates the different location.

3. The method of claim 1, wherein the different location is identified by a substantial match between one or more operation codes of the instruction profile and one or more operation codes of one or more machine instructions of the modified program.

4. The method of claim 1, wherein the creating comprises choosing a number of machine instructions to be included in the instruction profile.

5. The method of claim 4, wherein the choosing comprises:
- selecting a number of instructions to be included in a calibration profile;
- generating the calibration profile for a chosen line of the program, said calibration profile having the selected number of instructions for said chosen line;
- comparing one or more specific attributes of said calibration profile to one or more attributes of at least one line of code of the program to obtain a result;
- determining whether the result is an unambiguous result; and
- repeating, zero or more times, said selecting, said generating, said comparing, and said determining until the determining indicates an unambiguous result, wherein the selected number of instructions increases at each iteration, and wherein the selected number of instructions indicates, when there is an indication of an unambiguous result, the number of machine instructions to be included in the instruction profile.

6. The method of claim 1, wherein said automatically restoring is performed by a debugger.

7. A system of restoring debugging breakpoints in a source code program, said system comprising:
- a breakpoint that is set to a selected step of a first version of the source code;
- an instruction profile created for the selected step, said instruction profile comprising one or more specific attributes of one or more machine instructions generated for the selected step and one or more specific attributes of zero or more other machine instructions generated for the first version of source code, and wherein the instruction profile further comprises a source line number for the selected step and a length of the first version of source code,
- a modified program having a second version of source code; and
- means for automatically restoring the breakpoint to the selected step of a modified program, in response to modification of the first version of source code to provide the modified program, wherein the selected step is at a different location within the modified program and wherein the automatically restoring comprises comparing one or more operation codes of one or more machine instructions generated for the second version of source code with one or more operation codes of the instruction profile created based on the first version of source code to determine which machine instruction of the modified program corresponds most closely to the selected step and wherein the automatically restoring comprises using the source line number and length to determine a starting point within the modified program to select the one or more machine instructions generated for the second version of the source code to be used in the comparing.

8. The system of claim 7, wherein the comparing yields one or more difference counts and a difference count having a smallest value indicates the different location.

9. The system of claim 8, wherein the different location is identified by a substantial match between one or more specific attributes of the instruction profile and one or more specific attributes of one or more machine instructions of the modified program.

10. The system of claim 9, further comprising means for choosing a number of machine instructions to be included in the instruction profile, wherein the means for choosing comprises:
- means for selecting a number of instructions to be included in a calibration profile;
- means for generating the calibration profile for a chosen line of the program, said calibration profile having the selected number of instructions for said chosen line;
- means for comparing one or more specific attributes of said calibration profile to one or more specific attributes of at least one line of code of the program to obtain a result;
- means for determining whether the result is an unambiguous result; and
- means for repeating, zero or more times, said selecting, said generating, said comparing, and said determining until the determining indicates an unambiguous result, wherein the selected number of instructions increases at each iteration, and wherein the selected number of instructions indicates, when there is an indication of an unambiguous result, the number of machine instructions to be included in the instruction profile.

11. An article of manufacture comprising:
- at least one computer usable medium having computer readable program code logic to restore debugging breakpoints, the computer readable program code logic comprising:
  - logic in which a breakpoint is set to a selected step of a first version of source code of a program;
  - create logic to create an instruction profile for the selected step, said instruction profile comprising one or more specific attributes of one or more machine instructions generated for the selected step and one or more specific attributes of one or more operation codes of zero or more other machine instructions generated for the first version of source code to determine which machine instruction of the modified program corresponds most closely to the selected step; and
  - restore logic to automatically restore the breakpoint to the selected step of a modified program, in response to modification of the first version of source code to provide the modified program having a second version of source code, wherein the selected step is at a different location within the modified program, and wherein the restore logic comprises compare logic to compare one or more specific attributes of one or more machine instructions generated for the second version of source code with one or more specific attributes of the instruction profile created based on the first version of source code to determine which machine instruction of the modified program corresponds most closely to the different location.

12. The article of manufacture of claim 11, wherein the comparing yields one or more difference counts and a difference count having a smallest value indicates the different location.

13. The article of manufacture of claim 11, wherein the different location is identified by a substantial match between one or more specific attributes of the instruction profile and one or more specific attributes of one or more machine instructions of the modified program.

14. The article of manufacture of claim 11, wherein the logic to create comprises choose logic to choose a number of machine instructions to be included in the instruction profile, wherein the choose logic comprises:

select logic to select a number of instructions to be included in a calibration profile;

generate logic to generate the calibration profile for a chosen line of the program, said calibration profile having the selected number of instructions for said chosen line;

compare logic to compare one or more specific attributes of said calibration profile to one or more specific attributes of at least one line of code of the program to obtain a result;

determine logic to determine whether the result is an unambiguous result; and repeat logic to repeat, zero or more times, said selecting, said generating, said comparing, and said determining until the determining indicates an unambiguous result, wherein the selected number of instructions increases at each iteration, and wherein the selected number of instructions indicates, when there is an indication of an unambiguous result, the number of machine instructions to be included in the instruction profile.

* * * * *